UNITED STATES PATENT OFFICE.

ADOLPH PHILIP RAPP, OF NEW YORK, N. Y.

CHEWING-GUM OR CHEWING-GUM SUBSTITUTES.

1,397,742.   Specification of Letters Patent.   Patented Nov. 22, 1921.

No Drawing.   Application filed July 12, 1919. Serial No. 310,453.

*To all whom it may concern:*

Be it known that I, ADOLPH PHILIP RAPP, a citizen of Austria, and a resident of the borough of Manhattan, city, county and State of New York, have invented new and useful Improvements in Chewing-Gum or Chewing-Gum Substitutes, and the Manufacture Thereof, of which the following is a specification.

My invention relates to improvements in chewing gums, or chewing gum substitutes, and the object thereof is to produce a compound or composition possessing all the qualities necessary or desirable in a chewing gum or a chewing gum base, such compound being perfectly stable and not subject to oxidation and deterioration under the influence of atmospheric oxygen or light.

Most of the chewing gums and chewing gum substitutes patented and described so far consist of, or contain, rubbers of the butadiene type, such as pontianak, gutta siak, etc., which are oxidizable, and subject to deterioration and disintegration. If rubbers of the isoprene type (for instance Pará rubber) are employed, the resiliency and mechanical strength of such rubbers permit their use only to a very limited extent.

I have discovered that such isoprene type rubbers are very suitable and desirable in the manufacture of chewing gum and can be used up to the extent of about 35% of the total mass or more, provided such rubber is subjected to a process of depolymerization by heat or other means, which materially decreases its mechanical strength and resiliency. This depolymerization can be carried out for instance by either heating the rubber by itself or by heating a mixture of say 30% rubber and 70% of a suitable resin.

The rubber may also be depolymerized by heating it in a solvent of high boiling point, such as naphthalene, which is desirable not only because its boiling point is higher than the temperature to which the rubber is subjected, but also because the nature of naphthalene is such that it may easily be separated from the rubber, as by treatment with a solvent such as acetone, or by distillation or sublimation.

I have observed that best results are obtained if the rubber constituent of the chewing gum herein described consists of a mixture of several portions, such portions having been subjected to different degrees of depolymerization and being present, therefore, in different states of physical aggregation.

Chewing gum compositions heretofore described and containing a larger proportion of added resin, necessitated the use of a certain amount of oil, fat or wax in order to render such resin plastic. I have observed that such additions have a tendency to make the gum sticky, tacky and unfit for use. I find, however, that certain terpenes of polymers of the general formula $(C_{10}H_{16})_n$ do not have such tendency. If, for instance, Pará rubber is heated to about 200° C. for a few hours, or is subjected to dry distillation, a number of terpenes are obtained, such as dipentene, heveene, etc., which are entirely suitable for the purpose of softening the resins used in connection with chewing gum without rendering such resins sticky or tacky.

I have further discovered that the chewing qualities of such gum can be materially improved by providing a structure, such structure being developed, for instance, by pulling the gum, while slightly warm, by hand or on a candy pulling machine. The result of such pulling is the introduction of air spaces. The gum becomes lighter in color, and loses its stickiness and softness to a great extent.

As the structure so obtained would be lost again on heating the gum during subsequent stages of manufacturing chewing gum, I provide for a fixation of the structure. This I accomplish by introducing into the gum, during the pulling operation, a solution of a material which permits of being rendered insoluble in water or in the saliva of the mouth. If, for the purpose of illustration, egg albumen is employed for this purpose, the gum, after being treated with albumen, is partially dried and placed in boiling water until all the albumen contained therein is coagulated and rendered insoluble.

I have also discovered that the chewing qualities of such gum is materially improved by the addition of certain water-soluble constituents, consisting chiefly of such sugars as monoses, especially glucoses, etc., and calcium arabate (gum arabic). The addition of these compounds also greatly facilitates the grinding and further handling of the gum so obtained.

In carrying out the new method invented by me, and which results in the new chewing gum also invented by me, I produce a heterogen dispersed colloidal system, the two phases being represented by a rubber of the isoprene type (such as Pará rubber of commerce), on the one hand, and a series of compounds such as albumens, sugars (such as glucoses, monoses, etc.) and gum arabic, etc., on the other hand, the whole comprising about 30% of the mass, the rest being a suitable resin.

It will be distinctly understood, however, that the rubber element of this mass may consist of a rubber of a uniform degree of depolymerization, or the rubber element may consist of several portions, each portion being in a different state of physical aggregation.

In producing one form of the product for instance, I take Pará rubber of commerce and a suitable resin (for instance gum damar, cumarin resin, etc.) and combine these in a rubber mill in the proportion of, for instance, 30% rubber and 70% resin. 30% of this mixture is now depolymerized by subjecting it to a temperature of about 200° C. for say 4 hours, another 30% is subjected to such temperature for 8 hours and still another 30% is heated to said temperature for 12 hours.

As a result of these progressive treatments, in the instance under consideration, I have produced four compounds, or batches, each differing from the others in degree of plasticity, depolymerization or physical aggregation, and three of which are each of less than normal physical aggregation.

I now thoroughly mix all four batches and thus produce a compound, the several rubber portions of such compound having different degrees of plasticity, depolymerization or physical aggregation, uniformly distributed throughout the mass, so that, as far as possible, each portion of the compound differs from adjacent portions in plasticity, depolymerization or physical aggregation.

I now introduce into the compound a small quantity 5 to 10% of terpenes, for instance, the terpenes obtained by subjecting Pará rubber to destructive distillation, collecting and purifying the portion boiling between 150°–300° C. The terpenes obtained by the fractional distillation of certain essential oils in the manufacture of the so-called terpeneless oils are also entirely suitable for this purpose.

This mixture is now subjected to pulling or like action (for instance, in a pulling machine) while still warm. As the manipulation is continued, I introduce into the mass a water-solution containing a proteid, such as albumen (egg albumen for instance), gum arabic and glucose, in the proportions, of, say one part of albumen, two parts of glucose, and two parts of gum arabic.

The effect of the pulling and mixing is to produce, as I understand, a structure consisting, more or less, of extremely fine threads or tubes, or both, and which imprisons the proteid solution, and also imprisons air or has a large amount of air spaces uniformly distributed throughout the mass. After the proper structure is thought to be obtained, I again heat the mass to a temperature sufficient to coagulate the albumen and to thus bring about fixation of structure.

The use of a proteid for the purpose of fixing the structure is cited here only as one of the means by which fixation can be brought about.

The result is in the instance especially mentioned, a substantially non-oxidizable and fixed structure chewing gum (which is an especially satisfactory substitute for a gum containing chicle, which is now quite expensive,) having a base or body of rubber, several portions of which are of different degrees of plasticity, depolymerization or physical aggregation, uniformly distributed throughout the mass. So far as I am aware, this new chewing gum compound or chewing gum composition is the first to contain or be composed of isoprene rubber in a plastic state, or to contain or be composed of depolymerized isoprene rubber.

Having now particularly described and ascertained the nature of my said invention, and in what manner the same is to be performed, I declare that what I claim is:

1. A chewing gum containing plastic rubber of different degrees of depolymerization uniformly distributed through said gum.

2. A chewing gum containing an intimate mixture of plastic rubber and an added proteid.

3. A chewing gum containing an intimate mixture of plastic rubber, a resinous substance and albumen.

4. A non-oxidizable chewing gum having a fixed structure and containing an intimate mixture of plastic rubber, a resinous substance and a proteid.

5. A chewing gum containing plastic rubber in about the proportion of five per cent. of highly aggregated rubber and the remaining rubber being of less physical aggregation, the differently aggregated rubbers being thoroughly mixed and uniformly distributed throughout the gum.

6. A chewing gum containing isoprene rubber of less than normal physical aggregation.

7. A chewing gum containing rubber, a resinous material and an added nitrogeneous element, in intimate admixture.

8. In the preparation of a chewing gum, the steps which consist in making a mixture or rubber and a resinous substance; then separating a portion from such mixture and heating such portion; then afterward separating a portion from the last-mentioned body, and further heating such portion, and then thoroughly mixing the original mixture and the several portions, to produce a uniformly mixed mass of different degrees, of plasticity.

9. In the preparation of a chewing gum, the steps which consist in making a mixture of rubber and a resinous substance, then separating and heating substantially ninety per cent. of such mixture; then separating substantially half of the last-treated mixture and again heating the last-mentioned portion; and then thoroughly mixing the original mixture and the several portions treated as aforesaid, to produce a uniformly mixed mass of different degrees of plasticity.

10. In the preparation of a chewing gum, the steps which consist in making an intimate mixture of Pará rubber of commerce and a suitable resin; then separating and heating substantially ninety per cent. of such mixture to a temperature of about 200° C., for about two hours; then separating substantially half of the last-treated mixture and again heating the last mentioned portion to a temperature of about 200° C., for about three hours; and then thoroughly mixing the original mixture and the several portions treated as aforesaid, to produce a uniformly mixed mass of different degrees of plasticity.

11. In the preparation of a chewing gum, thoroughly mixing albumen containing material with a previously-prepared mass containing rubber having different degrees of plasticity throughout the same, and treating said structure to bring about fixation thereof.

12. In the preparation of a chewing gum, pulling a previously-prepared mass containing rubber having different degrees of plasticity throughout the same, simultaneously adding albumen-containing material to said mass, and then treating said structure to bring about fixation thereof.

13. In the preparation of a chewing gum, first making a mixture of rubber and a resinous substance; then dividing such mass, and heating a portion thereof to lower its physical aggregation; then dividing the mass so heated, and heating a divisional part thereof to still further lower its physical aggregation; then thoroughly mixing the original mass and the various divisions therefrom, to produce a uniformly mixed mass of different degrees of plasticity; then pulling said mass, while warm, and meanwhile mixing a proteid-containing material with said mass; and then treating the resulting structure to bring about fixation thereof.

14. In a process of making chewing gum, depolymerizing rubber by heating it in a solvent consisting of naphthalene, eliminating the naphthalene, and adding a suitable resin.

15. A process of making chewing gum which consists in depolymerizing Pará rubber by heating it in a suitable solvent, eliminating said solvent, and compounding the rubber so obtained with a suitable resin.

16. The process of making chewing gum which consists in depolymerizing a portion of a quantity of Pará rubber by heating in naphthalene, eliminating the naphthalene, and adding to the depolymerized rubber so obtained the other portion of the rubber, and a suitable resin.

ADOLPH PHILIP RAPP.